(12) United States Patent
Kato et al.

(10) Patent No.: US 6,783,222 B2
(45) Date of Patent: Aug. 31, 2004

(54) WATER BASE PIGMENT INK FOR INK-JET RECORDING AND INK-JET RECORDING METHOD

(75) Inventors: Ryuji Kato, Aichi-ken (JP); Hideto Yamazaki, Nagoya (JP)

(73) Assignee: Brother Kogyo Kabushiki Kaisha, Aichi-ken (JP)

(*) Notice: Subject to any disclaimer, the term of this patent is extended or adjusted under 35 U.S.C. 154(b) by 0 days.

(21) Appl. No.: 10/245,251

(22) Filed: Sep. 16, 2002

(65) Prior Publication Data

US 2003/0090554 A1 May 15, 2003

(30) Foreign Application Priority Data

Sep. 20, 2001 (JP) ........................................ 2001-286408

(51) Int. Cl.[7] ................................................. B41J 2/01
(52) U.S. Cl. ........................ 347/100; 347/95; 347/101; 106/31.13; 106/31.6
(58) Field of Search ................................ 347/100, 101, 347/95, 96; 106/31.6, 31.13; 523/160

(56) References Cited

U.S. PATENT DOCUMENTS 5,078,790 A * 1/1992 Tochihara et al. .......... 347/100
5,478,383 A * 12/1995 Nagashima et al. ........ 347/100
6,204,307 B1 * 3/2001 Miyabayashi .............. 106/31.6
6,399,674 B1 * 6/2002 Kashiwazaki et al. ...... 347/100

FOREIGN PATENT DOCUMENTS

| JP | 10-95941 | | 4/1998 | |
| JP | 10-298480 | * | 11/1998 | ........... C09D/11/16 |
| JP | 11-217532 | * | 8/1999 | ........... C09D/11/16 |

* cited by examiner

Primary Examiner—Stephen D. Meler
Assistant Examiner—Manish Shah
(74) Attorney, Agent, or Firm—Reed Smith LLP

(57) ABSTRACT

An ink for ink-jet recording consisting essentially of a water-soluble solvent, a pigment, and a compound represented by the following general formula (1):

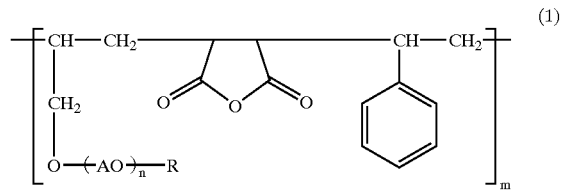

wherein AO represents oxyalkylene group, R represents alkyl group, and m and n represent natural numbers, respectively. It is possible to effectively suppress the feathering and the bleeding.

14 Claims, 3 Drawing Sheets

WATER BASE PIGMENT INK FOR INK-JET RECORDING AND INK-JET RECORDING METHOD

BACKGROUND OF THE INVENTION

1. Field of the Invention

The present invention relates to a water base pigment ink for ink-jet recording, an ink-jet recording apparatus which accommodates the same and an ink-jet recording method.

2. Description of the Related Art

In the ink-jet recording system, ink droplets are formed by means of a variety of ink discharge methods including, for example, an electrostatic attraction method, a method in which mechanical vibration or displacement is applied to the ink with a piezoelectric element, and a method in which bubbles are generated by heating the ink to utilize the pressure generated thereby, and all or a part of the ink droplets are adhered to a recording objective such as paper to perform the recording.

Those used as the ink composition to be employed for the ink-jet recording system include those in which a variety of water-soluble dyes or pigments are dissolved or dispersed in liquid media each comprising water or a combination of water and a water-soluble organic solvent. In order to achieve the object of the ink for ink-jet recording, the ink is required to possess optimum performance characteristics, for example, such that neither precipitation nor aggregation is caused even when the ink is not used for a long period of time, no clog-up occurs at the tip of the head of the ink-jet printer and in the ink flow passage, the printing quality is satisfactory, and the weather resistance is excellent.

The dye and the pigment, which are used as the coloring agent for the ink for ink-jet recording, may be compared with each other as follows. That is, the water resistance of the dye is unsatisfactory, because the dye is completely dissolved in the ink medium. The light resistance of the dye is fairly inferior to that of the pigment, in view of the chemical structure of the dye. On the contrary, the pigment is dispersed in the ink medium without being dissolved therein. Therefore, the weather resistance including the water resistance of the pigment is extremely satisfactory. Therefore, in recent years, the changeover is progressively made from the dye ink to the pigment ink for the ink for ink-jet recording.

Nowadays, the printing quality equivalent to that of the photographic image is demanded, in which the sharp edge is obtained, and the feathering and the bleeding are suppressed. A variety of suggestions have been made. Especially, glycol-based butyl ether, which is represented by triethylene glycol monobutyl ether as disclosed, for example, in Japanese Patent Application Laid-open No. 10-95941, is known as the permeating agent for the water base ink to suppress the feathering and the bleeding. The glycol-based butyl ether has faster permeation speed into the paper than, for example, the surfactant which is used as the ordinary permeating agent. Therefore, it is considered that the feathering and the bleeding can be suppressed thereby.

However, when the glycol-based butyl ether is added to the ink in an amount necessary to obtain the effect as described above, the blurring tends to occur on the paper surface, because the surface tension of the ink is lowered as well. Consequently, it has been impossible to assert that the effect to improve the feathering and the bleeding is sufficient.

SUMMARY OF THE INVENTION

The present invention has been made in order to solve the problem as described above, an object of which is to provide a water base pigment ink for ink-jet recording with which a printing quality including an extremely high image quality is obtained while suppressing the feathering and the bleeding.

According to a first aspect of the present invention, there is provided an ink for ink-jet recording comprising a water-soluble solvent; a pigment; and a compound represented by the following general formula (1):

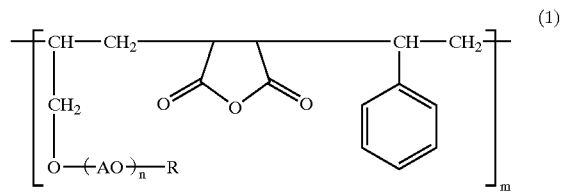

In the formula, AO represents oxyalkylene group, R represents alkyl group, and m and n represent natural numbers, respectively.

The water base pigment ink for ink-jet recording of the present invention contains the compound represented by the general formula (1) described above. The present inventors have found out that when the water base pigment ink for ink-jet recording containing the compound represented by the general formula (1) described above is used, it is possible to obtain a printing quality including an extremely high image quality in which the feathering and the bleeding are remarkably suppressed. Thus, the present invention has been consequently achieved.

According to a second aspect of the present invention, there is provided an ink-jet recording apparatus comprising an ink-jet head; an ink tank which accommodates an ink to be supplied to the ink-jet head; and the ink of the first aspect of the invention which is accommodated in the ink tank. The ink-jet recording apparatus of the present invention accommodates the water base pigment ink of the present invention. Therefore, it is possible to provide the water base pigment ink for ink-jet recording with which the printing quality including the extremely high image quality is obtained while suppressing the feathering and the bleeding. The ink tank may be an ink container fixedly provided in the ink-jet recording apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
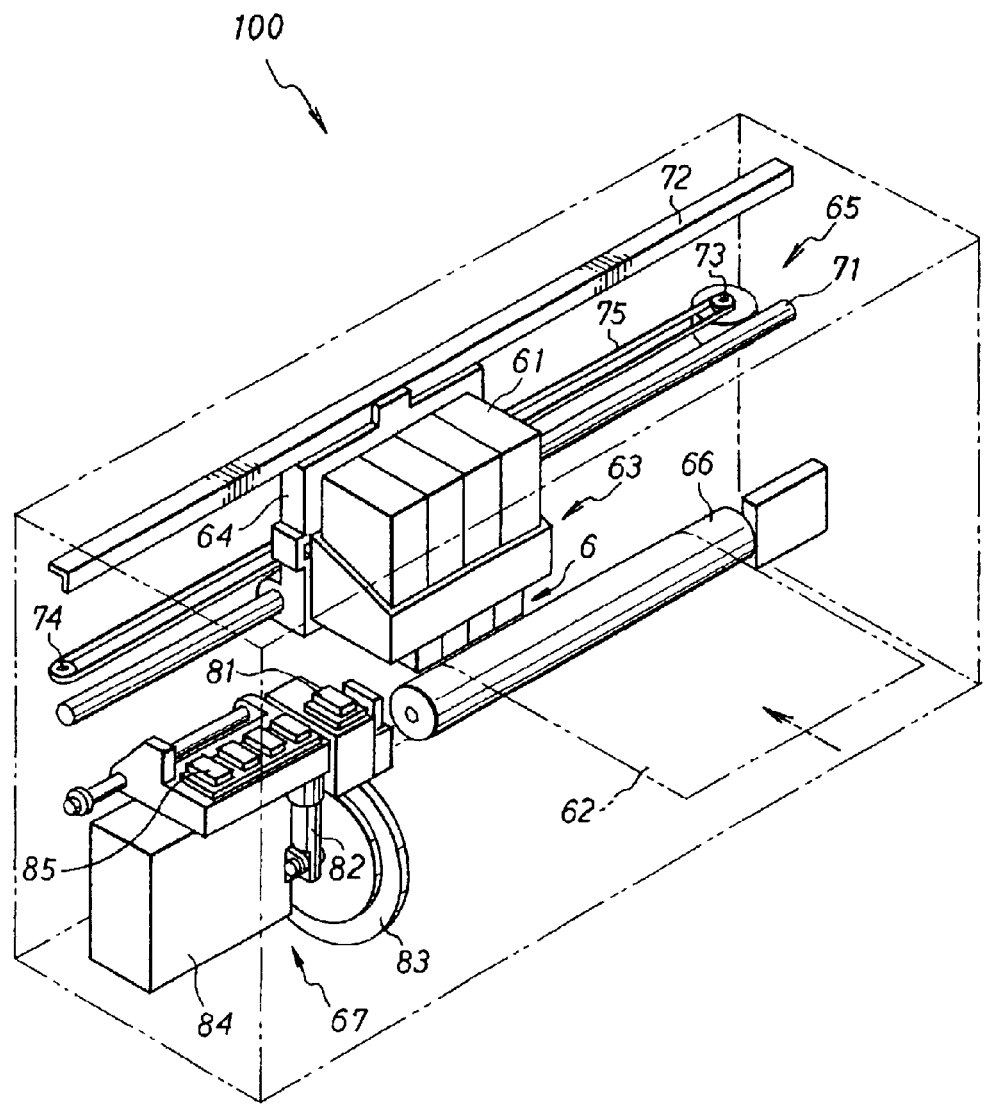
FIG. 1 is a perspective view showing a color ink-jet printer having an ink cartridge which contains color ink set prepared in examples of the invention.

The present invention will be explained in detail below. Commercially available products of the compound represented by general formula (1) may include, for example MALIALIM AKM-0531, MALIALIM AFB-1521, MALIALIM AAB-0851, and MALIALIM AAS-0851 (all produced by NOF Corporation). Especially, MALIALIM AKM-0531 and MALIALIM AFB-1521 are suitable for the water base ink for ink-jet recording, because they have high solubility in water. The compound as described above may be used singly. Alternatively, two or more species of the compounds may be used in combination.

The content of the compound represented by the general formula (1) described above is preferably 0.01 to 2% by weight with respect to the total weight of the water base pigment ink for ink-jet recording. If the content is less than 0.01% by weight, the feathering and the bleeding cannot be sufficiently suppressed in some cases. If the content exceeds 2% by weight, then the viscosity of the ink is increased, and any discharge failure of the ink is sometimes caused. The content is more preferably 0.02 to 1% by weight, and much more preferably 0.05 to 0.5% by weight.

The pigment is used as a coloring agent for the water base pigment ink for ink-jet recording of the present invention. The pigment may include, for example, Carbon Black, Pigment Yellow, Disazo Yellow, Isoindolinone Yellow, Pigment Red, Lake Red, Thioindigo Red, Brilliant Carmine 6B, Pigment Blue, Phthalocyanine Blue, and Phthalocyanine Green. The content of the pigment differs depending on the desired printing density and the coloration. However, in general, the content of the pigment is preferably 1 to 20% by weight, more preferably 1 to 15% by weight, and much more preferably 1 to 10% by weight with respect to the total weight of the water base pigment ink for ink-jet recording.

The solvent, which is used for the water base pigment ink for ink-jet recording of the present invention, is a mixed solvent composed of water and a water-soluble organic solvent. The water-soluble organic solvent is classified into those principally having an effect to prevent the ink from drying at the tip of the ink-jet head, and those principally having an effect to increase the drying speed of the ink on the paper surface.

In general, polyvalent alcohol is used in many cases for the water-soluble organic solvent having the effect to prevent the ink from drying. However, the water-soluble organic solvent having the effect to prevent the ink from drying may include, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol, and hexylene glycol; glycerol; 2-pyrrolidone; N-methyl-2-pyrrolidone; and 1,3-dimethyl-2-imidazolidinone. Among them, it is especially preferable to use glycerol and alkylene glycols such as diethylene glycol. In general, the content of the water-soluble organic solvent having the effect to prevent the ink from drying is preferably 0 to 95% by weight, more preferably 10 to 80% by weight, and much more preferably 10 to 50% by weight with respect to the total weight of the water base pigment ink for ink-jet recording.

The water-soluble organic solvent having the effect to increase the drying speed of the ink on the paper surface may include, for example, glycol-based ethers such as ethylene glycol monomethyl ether, ethylene glycol monoethyl ether, ethylene glycol monopropyl ether, diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tripropylene glycol monoethyl ether, and tripropylene glycol monopropyl ether. In general, the content of the water-soluble organic solvent having the effect to increase the drying speed of the ink on the paper surface is preferably 0 to 5% by weight, more preferably 0.1 to 2% by weight, and much more preferably 0.2 to 1% by weight with respect to the total weight of the water base pigment ink for ink-jet recording. If the content is too large, then the permeation of the ink into the paper is too enhanced, and any blurring is consequently caused.

Deionized water, which contains no various ions, is preferably used for water. The content of water is determined within a wide range depending on the type of the water-soluble organic solvent, the composition thereof, or the desired characteristics of the ink. However, in general, the content of water is preferably 10 to 95% by weight, more preferably 10 to 70% by weight, and much more preferably 20 to 70% by weight with respect to the total weight of the water base pigment ink for ink-jet recording.

Other than the above, the water base pigment ink for ink-jet recording of the present invention may be optionally added with conventionally known various additives including, for example, a viscosity-adjusting agent such as polyvinyl alcohol, cellulose, and water-soluble resin; a surface tension-adjusting agent, and a fungicidal agent.

The present invention will be explained in further detail below with reference to Example. However, the present invention is not limited to only Example.

EXAMPLE 1

Inks having compositions shown in Table 1 were prepared in accordance with the following method. At first, pure water, glycerol, triethylene glycol propyl ether (TEGPE), and MALIALIM AKM-0531 (produced by NOF Corporation) were mixed and agitated for 10 minutes to prepare an ink solvent with which a black pigment dispersion (FUJI SP BLACK 8796 produced by Fuji Pigment Co., Ltd.) was let down, followed by performing agitation for 30 minutes. After that, filtration was performed with a membrane filter having a pore size of 1 $\mu$m to obtain an black ink B1. Similarly, color inks Y1, M1, and C1 were prepared by using pigment dispersions of respective colors, i.e., a yellow pigment dispersion (FUJI SP YELLOW 4254 produced by Fuji Pigment Co., Ltd.), a magenta pigment dispersion (FUJI SP MAGENTA 9345 produced by Fuji Pigment Co., Ltd.), and a cyan pigment dispersion (FUJI SP BLUE 6447 produced by Fuji Pigment Co., Ltd.).

Comparative Example 1

A black ink B2 and color inks Y2, M2, and C2 having compositions shown in Table 1 were prepared in the same manner as in Example 1 except that MALIALIM AKM-0531 (produced by NOF Corporation) and MALIALIM AFB-1521 (produced by NOF Corporation) were not used for ink solvents.

TABLE 1

|  | Example 1 | | | | Comparative Example 1 | | | |
| --- | --- | --- | --- | --- | --- | --- | --- | --- |
|  | B1 | Y1 | M1 | C1 | B2 | Y2 | M2 | C2 |
| FUJI SP BLACK 8796 | 30 | — | — | — | 30 | — | — | — |
| FUJI SP YELLOW 4254 | — | 30 | — | — | — | 30 | — | — |
| FUJI SP MAGENTA 9345 | — | — | 30 | — | — | — | 30 | — |
| FUJI SP BLUE 6447 | — | — | — | 30 | — | — | — | 30 |
| MALIALIM AKM-0531 | 0.1 | 0.5 | — | — | — | — | — | — |
| MALIALIM AFB-1521 | — | — | 0.05 | 0.2 | — | — | — | — |
| Glycerol | 35 | 35 | 35 | 35 | 35 | 35 | 35 | 35 |
| TEGPE | 1 | — | 1 | — | 1 | 1 | — | 1 |
| Pure water | 33.9 | 33.5 | 33.95 | 33.8 | 34 | 33 | 34 | 34 |

(unit: parts by weight)

Evaluation

Evaluation was made in accordance with the following evaluation method for the inks prepared in Example 1 and Comparative Example 1.

(1) Discharge performance: The respective inks were subjected to printing by using a printer having an ink-jet head of the shearing mode type by means of two methods, i.e., a method for performing continuous discharge for 24 hours at respective atmospheric temperatures of 5° C., 20° C., and 40° C. to confirm the discharge stability, and a method for performing discharge after being left to stand for 2 months after one minute intermittent discharge (repetition for 10 minutes of continuous discharge for 1 minute and pause for 1 minute) to confirm the discharge response. The discharge performance was evaluated in accordance with the following criterion. +: discharge was satisfactory, and printing was successfully performed without any clog-up at the tip of the ink-jet head. −: discharge was unstable, and satisfactory printing was unsuccessful.

(2) Feathering: Ruled lines were printed with the inks of the respective colors by using a printer having an ink-jet head of the shearing mode type. The situation of the blurring degree was visually observed to make evaluation in accordance with the following criterion. +: blurring was scarcely observed. ±: blurring was at a degree of being inconspicuous, although blurring was slightly observed. −: blurring was conspicuous.

(3) Bleeding: A printing pattern, in which a single color background was used and lines of a color other than that of the background was printed in a superimposed manner, was printed with the inks of the respective colors by using a printer having an ink-jet head of the shearing mode type. The situation of mutual color blurring, which was caused at the boundary between the two colors, was visually observed to make evaluation in accordance with the following criterion. +: color blurring was scarcely observed. ±: color blurring was at a degree of being inconspicuous, although color blurring was slightly observed. −: color blurring was conspicuous. Evaluation results of the discharge performance and the feathering are shown in Table 2, and evaluation results of the bleeding are shown in Table 3.

TABLE 2

|  | Example 1 | | | | Comparative Example 1 | | | |
| --- | --- | --- | --- | --- | --- | --- | --- | --- |
|  | B1 | Y1 | M1 | C1 | B2 | Y2 | M2 | C2 |
| Discharge Performance | | | | | | | | |
| Discharge stability | + | + | + | + | + | + | + | + |
| Discharge response | + | + | + | + | + | + | + | + |
| Feathering | + | + | ± | + | − | − | − | − |

TABLE 3

|  |  | Line | | | |
| --- | --- | --- | --- | --- | --- |
|  |  | B1 | Y1 | M1 | C1 |
| Background | B1 | * | + | + | + |
|  | Y1 | + | * | + | + |
|  | M1 | + | + | * | + |
|  | C1 | + | + | + | * |

|  |  | Line | | | |
| --- | --- | --- | --- | --- | --- |
|  |  | B2 | Y2 | M2 | C2 |
| Background | B1 | * | − | ± | − |
|  | Y1 | ± | * | ± | ± |
|  | M1 | − | − | * | − |
|  | C1 | ± | ± | ± | * |

|  |  | Line | | | |
| --- | --- | --- | --- | --- | --- |
|  |  | B2 | Y2 | M2 | C2 |
| Background | B2 | * | − | − | − |
|  | Y2 | − | * | − | − |
|  | M2 | − | − | * | − |
|  | C2 | − | − | − | * |

|  |  | Line | | | |
| --- | --- | --- | --- | --- | --- |
|  |  | B1 | Y1 | M1 | C1 |
| Background | B2 | * | ± | − | ± |
|  | Y2 | − | * | − | ± |
|  | M2 | ± | ± | * | ± |
|  | C2 | − | ± | − | * |

In the case of the inks prepared in Example 1, the printing quality including the extremely high image quality, in which the feathering and the bleeding were remarkably suppressed, was obtained, and the discharge was performed in a satisfactory manner, because the inks prepared in Example 1 contained the compound represented by the general formula (1). On the other hand, in the case of the inks prepared in Comparative Example 1 containing no compound represented by the general formula (1), the feathering and the bleeding were conspicuous.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
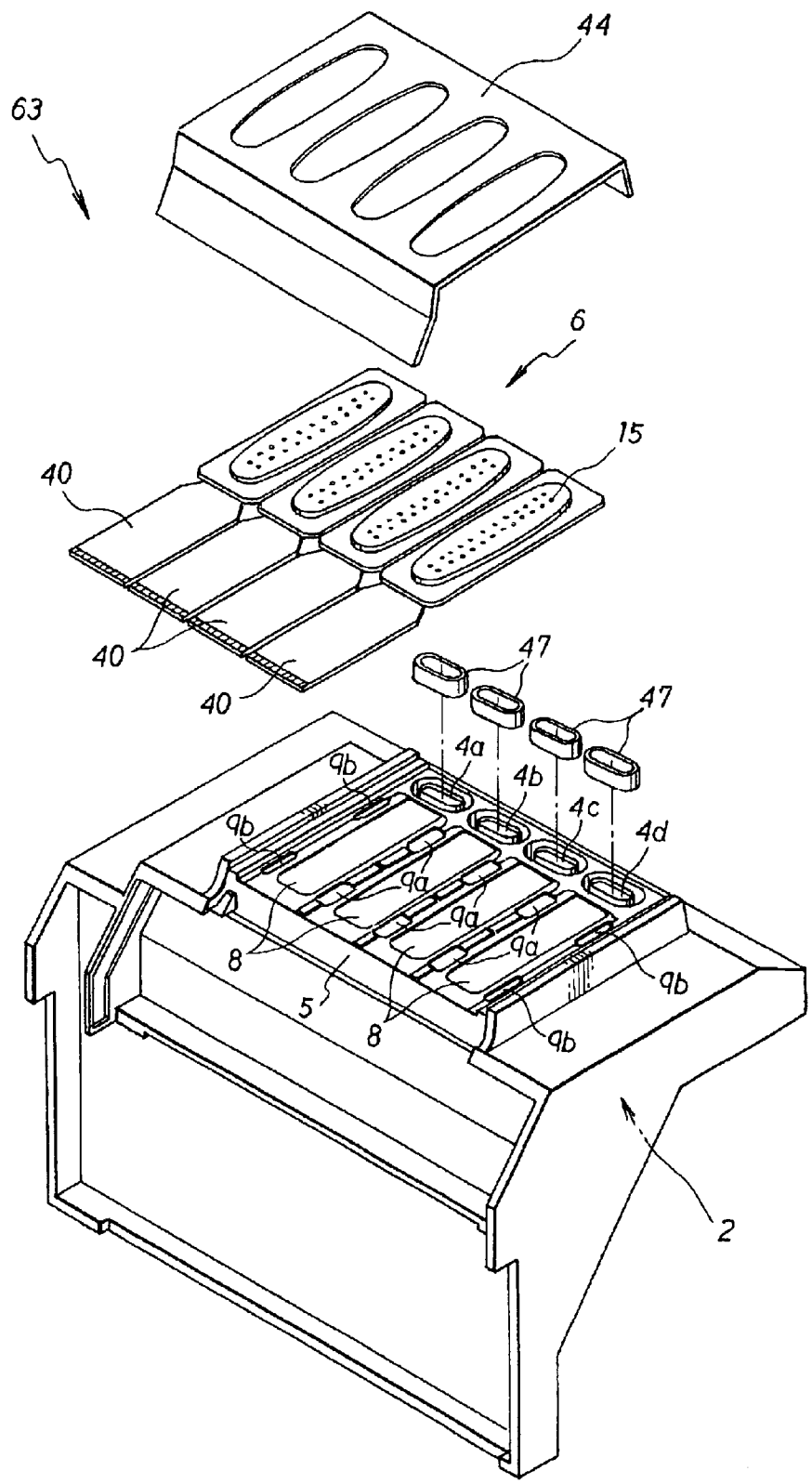
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
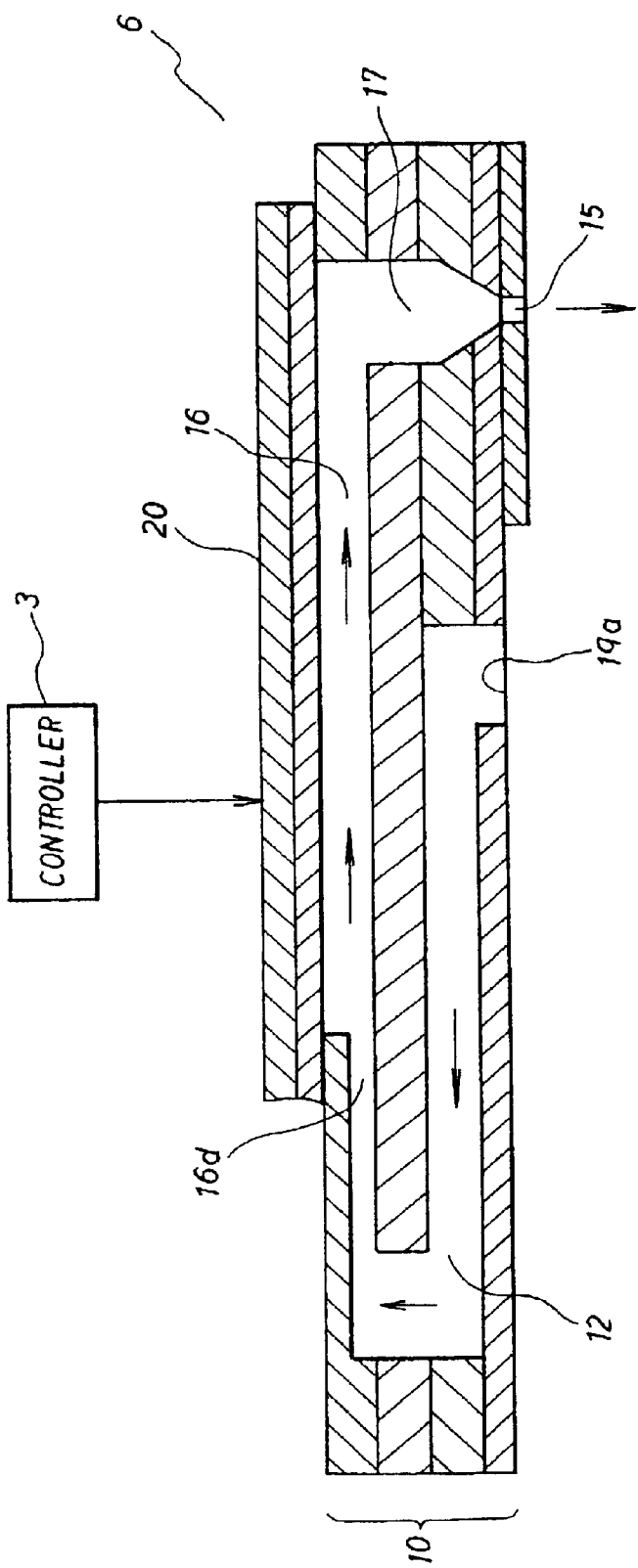
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 and 6,460,959. Further, the detailed structure of the printer and controlling method of the head unit are also disclosed in these U.S. patents, a content of which has been incorporated herein by reference.

The present invention is constructed as described above. Therefore, it is possible to provide the water base pigment ink for ink-jet recording with which the printing quality including the extremely high image quality is obtained while suppressing the feathering and the bleeding.

What is claimed is:

1. An ink for ink-jet recording consisting essentially of:

a water-soluble solvent;

a pigment; and a compound represented by the following general formula (1):

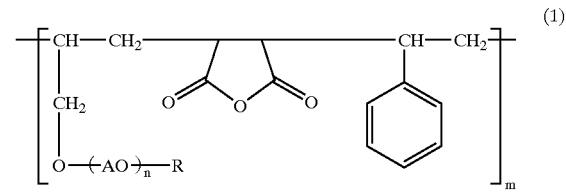

wherein AO represents oxyalkylene group, R represents alkyl group, and m and n represent natural numbers, respectively.

2. The ink according to claim 1, wherein the compound is contained in an amount of 0.01 to 2% by weight in the ink.

3. The ink according to claim 1, wherein the water-soluble solvent includes water and a water-soluble organic solvent.

4. An ink-jet recording apparatus comprising:

an ink-jet head;

an ink tank which accommodates an ink to be supplied to the ink-jet head; and the ink as defined in claim 1 which is accommodated in the ink tank.

5. The ink-jet recording apparatus according to claim 4, wherein the ink tank is a replaceable ink cartridge.

6. An ink for ink-jet recording consisting essentially of:

a water-soluble solvent;

a pigment;

water; and a compound represented by the following general formula (1):

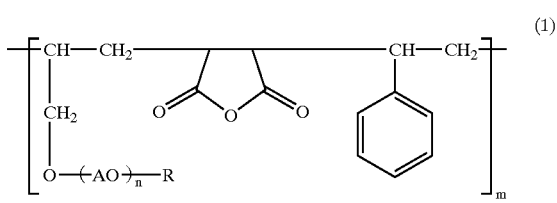

wherein AO represents oxyalkylene group, R represents alkyl group, and m and n represent natural numbers, respectively.

7. The ink according to claim 6, wherein the compound is contained in an amount of 0.01 to 2% by weight in the ink.

8. The ink according to claim 6, wherein the water-soluble solvent is a water-soluble organic solvent.

9. An ink-jet recording apparatus comprising:
   an ink-jet head;
   an ink tank which accommodates an ink to be supplied to the ink-jet head; and
   the ink as defined in claim 6 which is accommodated in the ink tank.

10. The ink-jet recording apparatus according to claim 9, wherein the ink tank is a replaceable ink cartridge.

11. A printing method comprising:
    a first step of printing a background with a first ink comprising a water-soluble solvent, a pigment, and a compound represented by the following general formula (1):

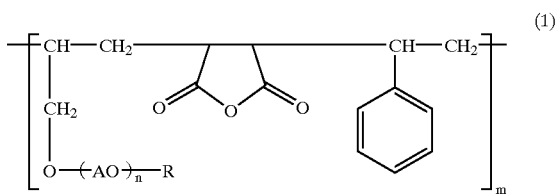

wherein AO represents oxyalkylene group, R represents alkyl group, and m and n represent natural numbers respectively; and a second step of printing an image on the background with a second ink comprising a water-soluble solvent, a pigment, and a compound represented by the general formula (1), wherein a color of the second ink is different from a color of the first ink.

12. The method according to claim 11, wherein the compound is contained in an amount of 0.01 to 2% by weight in the first ink and the compound is contained in an amount of 0.01 to 2% by weight in the second ink.

13. An ink-jet recording apparatus comprising:
    an ink-jet head; and
    an ink tank which accommodates a first ink and a second to be supplied to the ink-jet head, respectively;
    wherein the first ink comprises a water-soluble solvent, a pigment, and a compound represented by the following general formula (1):

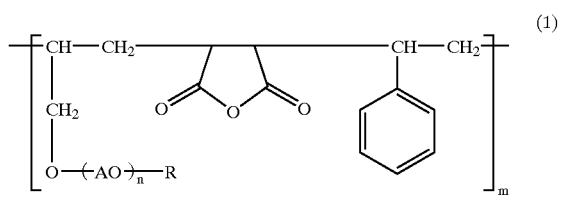

wherein AO represents oxyalkylene group, R represents alkyl group, and m and n represent natural numbers, respectively, the second ink comprises a water-soluble solvent, a pigment, and a compound represented by the general formula (1), and a color of the second ink is different from a color of the fist ink, and the ink-jet recording apparatus prints a background with the first ink and prints an image on the background with the second ink.

14. The ink-jet recording apparatus according to claim 13, wherein the compound is contained in an amount of 0.01 to 2% by weight in the first ink and the compound is contained in an amount of 0.01 to 2% by weight in the second ink.

* * * * *